United States Patent [19]

Wiesner

[11] 4,005,807
[45] Feb. 1, 1977

[54] METERING-DISTRIBUTOR OF THICK LIQUIDS, IN PARTICULAR, SYRUPS

[76] Inventor: Alfredo Wiesner, Via O.Beccari, 23, Rome, Italy, 00100

[22] Filed: June 10, 1975

[21] Appl. No.: 585,498

[30] Foreign Application Priority Data

June 19, 1974 Italy .................................. 51606/74

[52] U.S. Cl. ............................... 222/442; 222/450
[51] Int. Cl.² ......................................... G01F 11/28
[58] Field of Search .................. 222/442, 453, 450; 251/86, 353; 141/305, 308, 302, 303, 304, 306

[56] References Cited

UNITED STATES PATENTS

| | | | |
|---|---|---|---|
| 2,265,676 | 12/1941 | Stoddard | 222/453 X |
| 3,398,927 | 8/1968 | Ruter | 251/353 X |

*Primary Examiner*—Allen N. Knowles
*Assistant Examiner*—Hadd Lane
*Attorney, Agent, or Firm*—George J. Neilan

[57] ABSTRACT

An improved metering-distributor for thick liquids contained in bottles mounted on said metering-distributor in overturned position and comprising a support member through which a vertical conduit is arranged to put the bottle, mounted thereon, in communication with a cup placed therebelow and provided with an air intake from the atmosphere, in this cup reciprocating the upper shaped portion of a coaxial piston, the upper head of which is shaped to form a disc valve body adapted to close the outlet orifice of said conduit while at the lower portion of said piston a vertical conduit is arranged which opens at its lower end on the outside and its upper portion opens into the cup only in the upper limit position of the piston which is returned to its lower position by spring means, characterized by the fact that said support member is formed an assembly constituted of two parts connected to one another by releasable means and in which an axial conduit is arranged to put the bottle in communication with the cup, the entrance orifice of said conduit being closed by a disc valve under the action of a compression spring, but being caused to raise so as to take an inclined position as the second part of said support assembly is assembled with the first one.

2 Claims, 1 Drawing Figure

U.S. Patent  Feb. 1, 1977  4,005,807
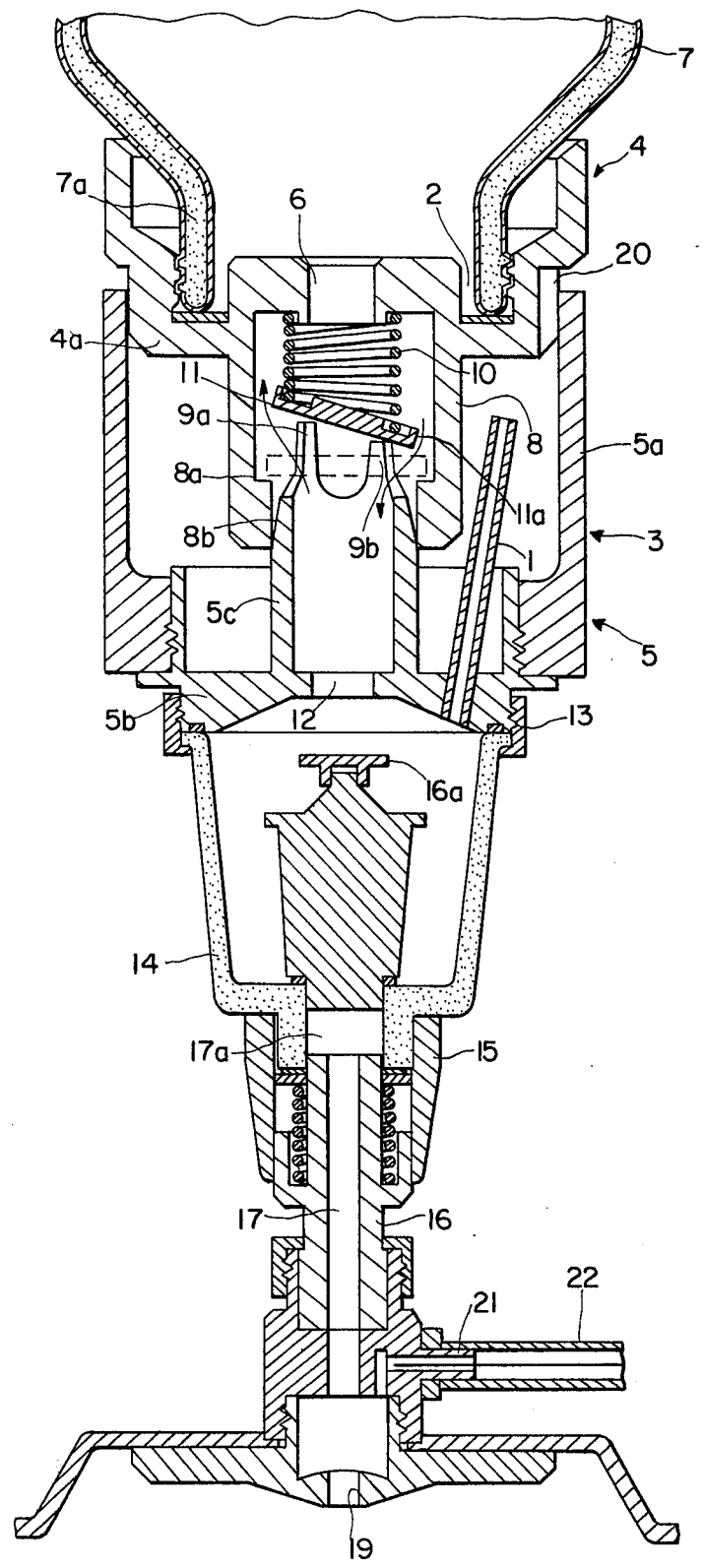

METERING-DISTRIBUTOR OF THICK LIQUIDS, IN PARTICULAR, SYRUPS

The present invention concerns an improved metering-distributor to distribute predetermined quantities of a thick liquid, as for instance, syrups to be used to prepare drinks.

Devices are already known designed to distribute predetermined metered quantities of a liquid contained in a bottle or other suitable containers and which are commonly called "Metering-Distributors" and which are used in public premises to permit to readily distribute alcoholic or non-alcoholic drinks contained into bottles, each of which is mounted on its respective metering-distributor in overturned position. Said metering-distributors comprise a support member carrying the bottle or the like, when this latter has been put in its overturned position, and a metering cup.

In the known metering-distributors a first valve (a ball valve for instance) is provided which is pushed towards its closing position by a spring. This valve controls a conduit passing through said support member and which opens into said cup, said valve opening as the bottle is mounted on said metering-distributor. Into said cup enters a coaxial piston which at its lower portion extends out of said cup and forms a second double valve allowing a metered quantity of liquid to be distributed, if said piston has been urged upwards against the action of a return spring. Said metering-distributors are used for dispensing metered quantities of alcoholic or non alcoholic drinks or syrups for an extemporaneous preparation of beverages in general. For this latter intended purpose in that portion of the piston which always remains on the outside of the metering-distributor a pipe union is provided for the connection of a pipe conveying another liquid, iced water, for instance, to flow together with the first liquid coming the metering-cup so as to obtain at the exit of said distributor an already perfectly mixed mixture of two or more components.

It has been noted that in the known metering-distributors there are certain difficulties and inaccuracy of their operation in the case wherein thick liquids are to be dispensed, in particular, syrups, since in their cut off valves of known type a liquid film is formed which has a certain consistency, and which delays the liquid passage as well as the passage of the air bubbles allowing the liquid to descend into the metering-cup. According to this invention the first of said valves has been modified and it is now constituted of a disc which can be automatically caused to open, when the bottle is mounted in the device in its operative overturned position. Further the opening of said valve is performed with a lifting and tilting movement of said disc so that in one of the side of the valve is obtained a narrower and shorter passage permitting the liquid to continuously and regularly flow down into the cup, while at the opposite side a wider and higher passage is created allowing the air bubbles to rise, thus permitting liquid to regularly flow out of the bottle, since two separate paths are formed, the one for the liquid and the other for the air so that a readier and more regular operation is obtained also in the case of very thick liquids.

These and other characteristics and advantages will become more evident from the following description of an embodiment of this invention taken in consideration together with the accompanying drawing, in which the single FIGURE shows a vertical axial section of the device in its operative position, while by dotted lines is shown the position of the disc valve before the assembling of the parts constituting the support assembly of the metering-distributor. This embodiment concerns a metering-distributor for dispensing drink syrups extemporaneously mixed with iced water.

The support assembly of the metering-distributor of the invention is generally marked 3 and is constituted of two parts generally indicated 4 and 5 and which are connected to one another in any suitable disassemblable manner.

The upper part 4 is constituted of a cylindric hollow body having a lower solid partition wall 4a bored by an axial hole 6. At its peripheral portion said wall 4a of the body 4 extends upwards forming an annular coaxial channel 2 to receive and support the neck 7a of the bottle 7, which is mounted in overturned position. From the lower surface of said partition wall 4a of the body 4 extends downwardly a cylindrical hollow projection 8 coaxial to and encircling the outlet orifice of the hole 6, the inner diameter of the inner chamber of said projection 8 being larger than that of the hole 6. Near its lower end of said tubular projection 8 an inner annular shoulder 8a is formed defining an axial conduit 8b of a diameter larger than that of the hole 6. In the inside of the projection 8 a helical compression spring 10 is provided pushing against the disc valve 11, the lower peripheral edge of which leans on said shoulder 8a. From the upper side of disc 11 there extends a peripheral edge 11a against which abuts said spring 10. The second part 5 constituting with part 4 the support assembly 3 comprises an outer sleeve portion 5a which only for structural purposes is disassemblably connected by means of threated portions, for instance, to a sleeve made integral with a central body 5b having the form of a solid disc.

The body 5b is bored by a hole 12 coaxial to the hole 6. About the cylindrical passage 12, the body 5b extends upwardly with a tubular member 5c ending with at least two fingers 9a and 9b having different heights. In the shown embodiment two higher fingers 9a are provided positioned on the opposite side of two shorter fingers 9b, said tubular member 5c being slightly tapered as to be inserted into the hole 8b in a liquid-tight manner in regard to the outside between the conduits 6 and 12, while at the same time the fingers 9a, 9b cause the disc valve to be raised up so as to attain an inclined position, said valve being under the effect of the spring 10 which tends to push said valve in its closed position (shown in dotted lines in the figure). In this manner near the higher portion of the peripheral edge of said valve 11 a wide passage is created through which the air bubbles can move upwardly while at the opposite side a little narrower passage is formed through which the syrup can flow downwardly regularly so that two flows are obtained which move in opposite directions, along one of which the air bubbles move and along the other the syrup flows down, said flows never interfering one with the other so that the operation of the metering distributor becomes readier and more reliable also if very thick liquids have to be dispensed.

The part 5b extends downwards with an annular projecting portion on which the metering cup 14 is fixed by means of a threaded ring 13. From the lower end of the cup 14 extends downwards a tubular dissamblable member 15 in the inside of which a spring is housed tending to push the piston 16 always downwards. The lower portion of the piston 16 extends always out of the member 15 whichever the position of the piston 16 may be, while its upper part is placed always within the cup 14 and is so shaped to form the 16a of the second double valve comprising an inserted disc 16a designed to close the outflow orifice of the passage 12 according to a well known solution.

At the lower portion of the piston body 16 an axial conduit 17 is arranged ending downwardly with an outflow orifice 19, while at its upper end said conduit 17 is connected with at least one radial conduit 17a positioned in that portion of the piston 16 which in its rest position remains in the inside of the outlet orifice from the cup 14, but which opens in the inner chamber of the cup 14 as the piston is moved upwards up to bring its head 16a to close the outlet orifice of the conduit 12.

In the shown embodiment in that portion of the piston which remains in whichever operative position of this latter on the outside of the member 15 a branched conduit 21 is arranged ending with a pipe union for the connection of a pipe 22, which is at least partially flexible so as to permit that such a pipe 22 can follow the movement of the piston 16, said pipe 22 conveying chilled water which after passing through the conduit 22 enters the main conduit 17 forming a mixture with the syrup or the like, so that through the outflow orifice 19 will be dispensed the desired mixed drink.

Through the base of the sleeve body 5, 5a also passes a small tube 1 putting in communication the ceiling of the inner chamber of the cup 14 with the annular chamber defined by the outer wall 5a of the body 5 and the annular projection 8, said annular chamber communicating with the atmosphere through at least a hole 20 or the like. The small tube 1 together with the hole 20 constitutes an air intake allowing the filling and the emptying of the metering cup 14.

What we claim is:

1. An improved metering-distributor for thick liquids contained in a bottle mounted on said metering-distributor in overturned position and comprising a support member through which a vertical conduit is arranged to put the bottle, mounted thereon, in communication with a cup placed therebelow and provided with an air intake from the atmosphere, in this cup reciprocating the upper shaped portion of a coaxial piston, the upper head of which is shaped to form a disc valve body adapted to close the outlet orifice of said conduit while at the lower portion of said piston a vertical conduit is arranged which opens at its lower end on the outside and its upper portion opens into the cup only in the upper limit position of the piston which is returned to its lower position by spring means, characterized by the fact that said support member is an assembly constituted of two parts connected to one another by releasable means and in which an axial conduit is arranged to put the bottle in communication with the cup, , a second disc valve disposed at the entrance orifice of said conduit, a compression spring contacting said second disc valve, and means to maintain said second disc valve in an inclined position against the bias of said compression spring when said support assembly is assembled to define a wider passage on one side of said second disc valve and a narrower passage on the other side thereof, whereby said entrance orifice is permanently open during operation with the wider passage allowing air bubbles to rise and with the narrower passage permitting thick liquid to flow downwardly.

2. A metering-distributor according to claim 1, wherein the support assembly is formed by a upper part so shaped as to support the bottle and to receive its neck in the overturned position of said bottle, said part extending downwardly with a tubular projection provided with an inner shoulder forming the seat of the said disc valve and housing the spring acting thereon, while the second part forms a sleeve body provided with means for the connection to the cup and which extends axially upwardly with a tubular portion ending with at least two fingers of different heights so proportioned and positioned as to be inserted, in a liquid tight manner, into the downwardly extending projection of the first part of said support assembly, said fingers causing the comprising the means second disc valve to take an inclined position when the two parts forming the support assembly are assembled to one another thus defining a wider passage on one side of the valve and a narrower passage on the opposite side, between the inner chamber of the cup and the annular chamber defined in combination by the first and the second parts of the support assembly being provided a small conduit serving as an air intake of air suctioned from the atmosphere through at least a hole arranged in the peripheral wall of said support assembly.

* * * * *